United States Patent [19]

White

[11] 4,424,863

[45] Jan. 10, 1984

[54] OIL RECOVERY BY WATERFLOODING

[75] Inventor: James R. White, Washington Crossing, Pa.

[73] Assignee: Mobil Oil Corporation, New York, N.Y.

[21] Appl. No.: 308,958

[22] Filed: Oct. 6, 1981

[51] Int. Cl.$^3$ ...................... E21B 43/20; E21B 43/24
[52] U.S. Cl. .................................................. 166/268
[58] Field of Search .............. 166/268, 272, 261, 252

[56] References Cited

U.S. PATENT DOCUMENTS

| | | | |
|---|---|---|---|
| 1,511,067 | 10/1924 | Russell | 166/268 X |
| 3,019,837 | 2/1962 | Marx et al. | 166/256 |
| 3,196,945 | 7/1965 | Craig, Jr., et al. | 166/261 |
| 3,439,743 | 4/1969 | Wyllie | 166/272 |
| 3,964,545 | 6/1976 | Speller, Jr. | 166/268 X |
| 3,976,137 | 8/1976 | Bousaid | 166/272 |
| 4,252,191 | 2/1981 | Pusch et al. | 166/272 X |

*Primary Examiner*—Stephen J. Novosad
*Attorney, Agent, or Firm*—Alexander J. McKillop; Michael G. Gilman; James P. O'Sullivan, Sr.

[57] ABSTRACT

This invention provides a method for the recovery of oil from a subterranean oil reservoir penetrated by spaced apart injection system and production system in which an aqueous fluid is injected into the reservoir via the injection system to displace oil to the production system, the improvement comprising dissolving molecular oxygen in the aqueous fluid being injected into the water under pressure sufficient to maintain liquid phase oxidation at reservoir conditions.

1 Claim, No Drawings

OIL RECOVERY BY WATERFLOODING

BACKGROUND OF THE INVENTION

1. Field of the Invention

This invention relates to improved waterflooding operation in subterranean reservoirs involving the injection of molecular oxygen-containing water into the reservoir.

2. Description of the Prior Art

In the recovery of oil form oil-bearing subterranean reservoirs, it usually is possible to recover only minor portions of the original oil in place by the so-called primary recovery methods which utilize only the natural forces in the reservoir. In order to increase the production of oil from subterranean reservoirs, resort has been taken to a variety of supplemental (secondary) recovery techniques. The most widely used supplemental technique is waterflooding, which involves the injection of water into the reservoir. As the water moves through the reservoir, it acts to displace oil therein toward a production system comprising one or more wells through which the oil is recovered.

It has long been recognized that factors such as the interfacial tension between the injected water and the reservoir oil, the relative mobilities of the reservoir oil and injected water, and the wettability characteristics of the rock surfaces within the reservoir are factors which influence the amount of oil recovered by waterflooding. Thus, it has been proposed to add surfactants to the flood water in order to lower the oil-water interfacial tension and/or to alter the wettability characteristics of the reservoir rock. Also, it has been proposed to add viscosifiers such as polymeric thickening agents to all or part of the injected water in order to increase the viscosity thereof, thus decreasing the mobility ratio between the injected water and oil and improving the sweep efficiency of the waterflood.

The effects of reservoir temperature on oil viscosity are related to the oil's viscosity at a reference temperature and the oil's paraffinicity. A viscosity/temperature plot for a wide variety of crude oils is shown in W. B. Braden, *Annual Fall Meeting of Soc. Pet. Eng.*, SPE No. 1580, Oct. 1966, which is incorporated herein by reference. Water's (brine) viscosity changes less rapidly with temperature. Water viscosities will all lie below the ranges in the plot.

The purpose of this invention is to supplement a waterflood operation by reducing the viscosity of the oil being produced, thereby increasing flowability and improving sweep efficiency. This is accomplished by dissolving molecular oxygen gas under pressure in the injected water, whereby controlled oxidation of part of the crude oil trapped in the porous rock liberated heat that reduces the viscosity of the remaining oil, thus stimulating its displacement and recovery. Insofar as is now known, this operation has not been proposed.

SUMMARY OF THE INVENTION

This invention provides in a method for the recovery of oil from a subterranean oil reservoir penetrated by spaced apart injection system and production system in which an aqueous fluid is injected into the reservoir via the injection system to displace oil to the production system, the improvement comprising dissolving molecular oxygen in the aqueous fluid being injected into the reservoir under pressure sufficient to maintain liquid phase oxidation at reservoir conditions.

DESCRIPTION OF SPECIFIC EMBODIMENTS

The method of this invention is applicable as an adjuvant to waterflood operations. It is primarily adapted to secondary recovery of light oils by waterflooding, but could be useful as a supplement to thermal recovery, such as by fireflooding, of heavy oils.

The present invention is carried out in a subterranean reservoir that is penetrated by spaced apart injection and production systems extending from the surface of the earth into the oil-bearing formation. The injection system comprises one or more wells into which are introduced fluids. The production system comprises one or more wells from which product is recovered. The wells in the injection and production systems are spaced apart and can be arranged in any desired pattern, such patterns being well known in waterflood operations. For example, the pattern can comprise a central injection well and a plurality of recovery wells spaced radially about the injection well.

The aqueous fluid used in the method of this invention is water or brine. An ideal source of brine is connate water previously obtained in production from the formation. If desirable, in the formation being produced the aqueous fluid can contain surfactants, such as anionic surface active agents or viscosifiers, such as polymeric thickening agents.

In accordance with this invention, molecular oxygen is dissolved in the aqueous fluid injected into the reservoir. Oxidation of hydrocarbons dissolved or dispersed in water or brine takes place readily at modest temperatures of 150°–650° F. (65°–343° C.), provided the aqueous phase is maintained under pressure sufficient to maintain it in the liquid phase and contains sufficient dissolved oxygen. If it is allowed to flash to steam, the very high heat of vaporization usually drops temperatures to below those at which oxidation takes place readily. With sufficient pressure, liquid phase oxidation up to the critical temperature of water (374° C.) can be effected. Most petroleum reservoirs provide sufficient pressure to achieve liquid phase oxidation up to quite high temperatures. For example, Mobil's West Ranch field is about 2600 psi., which permit attaining up to about 650° F. (about 343° C.).

Oxygen is quite soluble in water (brine) under pressure and its solubility increases rapidly with temperature. Adequate oxygen to sustain a reasonable extent of crude oil oxidation underground can be transported into a reservoir dissolved in the injected waterflood brine. The amount dissolved can be used to control the extent and rate of oxidation desired. For example, under West Ranch field conditions, one nominal pore volume of brine can contain enough dissolved oxygen to oxidize to $CO_2$ and $H_2O$ on average about 10% of crude oil contained in 10% of the reservoir volume. Of course, other oxidants such as $H_2O_2$ can be used either in place of oxygen or as a supplement to it. In general, these are more costly.

In a petroleum reservoir, the heat released in oil oxidation will be largely trapped and serves to heat the rock, brine, and remaining oil. Principal losses are to produced fluids and via conductive transport to non-producing zones. When account is taken of heat capacities and flows, oxidation of as little as 10% of the oil in place is sufficient to raise temperatures on average by an incremental amount of about 250° F. (121° C.) at least in reservoirs where conductive loss is small (30% pore volume; 70% brine saturation; 30% oil saturation— a typical watered-out zone in a light oil field).

The process aims at achieving more uniform distribution of heat within a reservoir by transporting-in oxidant (oxygen) dissolved in secondary waterflood brine, in concentration tailored to allow spreading out the oxidation zone as much as practicable. This would be coincident with a slow increase in reservoir temperatures also spread out as uniformly as practicable. Monitoring of temperatures, and oxygen concentrations at observation points or in produced fluids could be used to help control the thermal waterflood via oxygen concentration control or inclusion of catalytic ions, if needed, such as copper or cobalt.

The process has a large potential advantage over other proposed enhanced oil recovery concepts (chemical dispersants, mobility control agents, etc.) in requiring a comparatively inexpensive chemical agent, oxygen (in some favorable cases, perhaps, even air) or other oxygen-containing gas mixtures. Although some subsidiary benefits of oil oxidation during displacement can occur in special cases, (e.g., oxidation products may act as dispersants; $CO_2$ produced can serve as a displacing fluid) the principal benefit expected is thermal enhancement.

Although the present invention has been described with specific embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. In a method for the recovery of oil from a subterranean oil reservoir penetrated by spaced apart injection system and production system in which an aqueous liquid is injected into the reservoir via the injection system to displace oil to the production system, the improvement comprising dissolving molecular oxygen in the aqueous liquid being injected into the reservoir under pressure sufficient to maintain liquid phase oxidation at reservoir conditions, said pressure being sufficient to prevent said injected liquid from being converted to steam.

* * * * *